US008213333B2

(12) United States Patent
Greel et al.

(10) Patent No.: US 8,213,333 B2
(45) Date of Patent: Jul. 3, 2012

(54) IDENTIFYING AND RESOLVING PROBLEMS IN WIRELESS DEVICE CONFIGURATIONS

(76) Inventors: Chip Greel, San Jose, CA (US); George Meers, San Jose, CA (US); Gayle L. Noble, Boulder Creek, CA (US); William David Teeple, San Jose, CA (US)

(*) Notice: Subject to any disclaimer, the term of this patent is extended or adjusted under 35 U.S.C. 154(b) by 190 days.

(21) Appl. No.: 11/776,226

(22) Filed: Jul. 11, 2007

(65) Prior Publication Data

US 2008/0013463 A1 Jan. 17, 2008

Related U.S. Application Data

(60) Provisional application No. 60/830,220, filed on Jul. 12, 2006.

(51) Int. Cl.
*H04L 12/28* (2006.01)
(52) U.S. Cl. ........ 370/254; 370/252; 370/338; 455/411; 455/423; 455/41.2
(58) Field of Classification Search .................. 370/331, 370/338, 252, 254; 709/203, 220; 455/423, 455/446
See application file for complete search history.

(56) References Cited

U.S. PATENT DOCUMENTS

| 4,340,932 | A | 7/1982 | Bakula et al. |
|---|---|---|---|
| 4,468,728 | A | 8/1984 | Wang |
| 4,611,272 | A | 9/1986 | Lomet |
| 4,775,956 | A | 10/1988 | Kaji et al. |
| 4,866,701 | A | 9/1989 | Giacopelli et al. |
| 4,879,630 | A | 11/1989 | Boucard et al. |
| 4,891,803 | A | 1/1990 | Huang et al. |
| 5,390,359 | A | 2/1995 | Damerau |
| 5,416,769 | A | 5/1995 | Karol |
| 5,459,731 | A | 10/1995 | Brief |
| 5,461,614 | A | 10/1995 | Lindholm |
| 5,500,858 | A | 3/1996 | McKeown |
| 5,625,371 | A | 4/1997 | Miller et al. |
| 5,659,680 | A | 8/1997 | Cunningham et al. |
| 5,724,509 | A * | 3/1998 | Starkweather et al. ....... 709/220 |

(Continued)

FOREIGN PATENT DOCUMENTS

WO 2004097576 11/2004

(Continued)

OTHER PUBLICATIONS

U.S. Appl. No. 10/218,343, filed Aug. 13, 2002, Farley et al.

(Continued)

*Primary Examiner* — Ricky Ngo
*Assistant Examiner* — Rasheed Gidado
(74) *Attorney, Agent, or Firm* — Volentine & Whitt, PLLC

(57) ABSTRACT

Systems and methods for identifying and resolving problems in wireless device configurations in a wireless network. In one example embodiment, a method for resolving wireless device configuration problems includes various acts including identifying all wireless devices that are wired to a network, retrieving configuration information from each wireless device, retrieving wireless device incompatibility information and corresponding configuration solutions for each wireless device, attempting to contact each wireless device over one or more wireless communication channels in order to determine if one or more wireless capabilities of each wireless device are functioning properly, and determining that the incompatibility information of one of the wireless devices with a malfunctioning wireless capability conflicts with the configuration information of one or more of the wireless devices.

20 Claims, 7 Drawing Sheets

U.S. PATENT DOCUMENTS

| | | |
|---|---|---|
| 5,786,921 A | 7/1998 | Wang et al. |
| 5,793,871 A | 8/1998 | Jackson |
| 5,841,982 A | 11/1998 | Brouwer et al. |
| 5,847,708 A | 12/1998 | Wolff |
| 5,850,388 A | 12/1998 | Anderson et al. |
| 5,884,072 A | 3/1999 | Rasmussen |
| 5,978,947 A | 11/1999 | Kim et al. |
| 6,115,680 A | 9/2000 | Coffee et al. |
| 6,163,681 A | 12/2000 | Wright et al. |
| 6,246,684 B1 | 6/2001 | Chapman et al. |
| 6,266,789 B1 | 7/2001 | Bucher et al. |
| 6,298,047 B1 | 10/2001 | Steffes et al. |
| 6,393,341 B1 | 5/2002 | Lawrence et al. |
| 6,393,587 B2 | 5/2002 | Bucher et al. |
| 6,467,053 B1 | 10/2002 | Connolly et al. |
| 6,473,794 B1 | 10/2002 | Guheen et al. |
| 6,480,313 B1 | 11/2002 | Kawamura |
| 6,507,923 B1 | 1/2003 | Wall et al. |
| 6,618,368 B1 | 9/2003 | Tanigawa et al. |
| 6,662,009 B2 | 12/2003 | Lynn |
| 6,674,724 B1 | 1/2004 | Main et al. |
| 6,678,275 B1 | 1/2004 | DeGrandpre et al. |
| 6,686,759 B1 | 2/2004 | Swamy |
| 6,691,165 B1 | 2/2004 | Bruck et al. |
| 6,697,379 B1 | 2/2004 | Jacquet et al. |
| 6,714,217 B2 | 3/2004 | Huang et al. |
| 6,738,645 B2 | 5/2004 | Knight |
| 6,745,011 B1 | 6/2004 | Hendrickson et al. |
| 6,754,488 B1 | 6/2004 | Won et al. |
| 6,791,956 B1 | 9/2004 | Leu |
| 6,801,756 B1 | 10/2004 | Agrawal et al. |
| 6,801,949 B1 | 10/2004 | Bruck et al. |
| 6,839,321 B1 | 1/2005 | Chiruvolu |
| 6,842,429 B1 | 1/2005 | Shridhar et al. |
| 6,850,483 B1 | 2/2005 | Semaan |
| 6,853,620 B2 | 2/2005 | Mauritz et al. |
| 6,880,070 B2 | 4/2005 | Gentieu et al. |
| 6,910,149 B2 | 6/2005 | Perloff et al. |
| 6,931,574 B1 | 8/2005 | Coupal et al. |
| 6,934,477 B2 | 8/2005 | Willebrand |
| 6,941,482 B2 | 9/2005 | Strong |
| 6,954,789 B2 | 10/2005 | Dietz et al. |
| 6,970,917 B1 | 11/2005 | Kushwaha et al. |
| 6,996,418 B2 | 2/2006 | Teo et al. |
| 7,003,080 B1 | 2/2006 | Doskow et al. |
| 7,007,208 B1 | 2/2006 | Hibbert et al. |
| 7,027,808 B2 | 4/2006 | Wesby |
| 7,031,266 B1 * | 4/2006 | Patel et al. .................... 370/254 |
| 7,062,264 B2 | 6/2006 | Ko et al. |
| 7,100,092 B2 | 8/2006 | Allred et al. |
| 7,110,954 B2 | 9/2006 | Yung et al. |
| 7,120,149 B2 | 10/2006 | Salamat |
| 7,181,663 B2 | 2/2007 | Hildebrant |
| 7,194,503 B2 * | 3/2007 | Shell et al. .................... 709/202 |
| 7,206,972 B2 | 4/2007 | Wilson et al. |
| 7,224,968 B2 | 5/2007 | Dobson et al. |
| 7,257,741 B1 | 8/2007 | Palenik et al. |
| 7,283,505 B1 * | 10/2007 | Meenan et al. .................. 370/338 |
| 7,283,816 B2 | 10/2007 | Fok et al. |
| 7,286,510 B2 * | 10/2007 | Wang et al. .................... 370/338 |
| 7,286,515 B2 | 10/2007 | Olson et al. |
| 7,286,647 B2 | 10/2007 | Stormon et al. |
| 7,313,113 B1 | 12/2007 | Hills et al. |
| 7,330,662 B2 | 2/2008 | Zimmerman |
| 7,343,524 B2 | 3/2008 | Klotz et al. |
| 7,349,692 B2 | 3/2008 | Ko et al. |
| 7,363,022 B2 * | 4/2008 | Whelan et al. ................. 455/411 |
| 7,372,848 B2 | 5/2008 | Doerr et al. |
| 7,380,154 B2 | 5/2008 | Gale et al. |
| 7,457,312 B2 | 11/2008 | Weiss et al. |
| 7,483,974 B2 | 1/2009 | Goud et al. |
| 7,522,904 B1 * | 4/2009 | Zhu ............................... 455/403 |
| 7,523,198 B2 | 4/2009 | Wu et al. |
| 7,526,322 B2 | 4/2009 | Whistler |
| 7,545,740 B2 | 6/2009 | Zelig et al. |
| 7,551,922 B2 | 6/2009 | Roskowski et al. |
| 2001/0016925 A1 | 8/2001 | Bucher |
| 2001/0049263 A1 | 12/2001 | Zhang |
| 2002/0025795 A1 | 2/2002 | Sharon et al. |
| 2002/0044662 A1 | 4/2002 | Sowler |
| 2002/0055999 A1 | 5/2002 | Takeda |
| 2002/0068600 A1 | 6/2002 | Chihara et al. |
| 2002/0078178 A1 | 6/2002 | Senoh |
| 2002/0112041 A1 | 8/2002 | Viscount et al. |
| 2002/0122050 A1 | 9/2002 | Sandberg |
| 2002/0161875 A1 | 10/2002 | Raymond |
| 2002/0181405 A1 | 12/2002 | Ying |
| 2002/0181506 A1 | 12/2002 | Loguinov |
| 2003/0038769 A1 | 2/2003 | Turpin et al. |
| 2003/0048854 A1 | 3/2003 | Kaku |
| 2003/0157895 A1 | 8/2003 | Agrawal et al. |
| 2003/0167405 A1 | 9/2003 | Freund et al. |
| 2003/0204781 A1 | 10/2003 | Peebles et al. |
| 2003/0220112 A1 | 11/2003 | Bugeja |
| 2003/0231607 A1 * | 12/2003 | Scanlon et al. ................. 370/338 |
| 2004/0005873 A1 * | 1/2004 | Groenendaal et al. ......... 455/410 |
| 2004/0006633 A1 | 1/2004 | Chandra et al. |
| 2004/0015317 A1 | 1/2004 | Klotz et al. |
| 2004/0054680 A1 | 3/2004 | Kelley et al. |
| 2004/0057389 A1 | 3/2004 | Klotz et al. |
| 2004/0076194 A1 | 4/2004 | Okamoto et al. |
| 2004/0100963 A1 | 5/2004 | Guo |
| 2004/0107391 A1 | 6/2004 | Bauman |
| 2004/0133733 A1 | 7/2004 | Bean et al. |
| 2004/0153267 A1 | 8/2004 | Fishman et al. |
| 2004/0177344 A1 | 9/2004 | Kuo |
| 2004/0185876 A1 * | 9/2004 | Groenendaal et al. ...... 455/456.5 |
| 2004/0199568 A1 | 10/2004 | Lund |
| 2004/0203379 A1 | 10/2004 | Witkowski et al. |
| 2004/0225916 A1 | 11/2004 | Clark |
| 2004/0242197 A1 * | 12/2004 | Fontaine ....................... 455/411 |
| 2004/0255191 A1 | 12/2004 | Fox et al. |
| 2004/0264448 A1 | 12/2004 | Wise et al. |
| 2005/0013300 A1 | 1/2005 | Akahane et al. |
| 2005/0034055 A1 | 2/2005 | Rangan et al. |
| 2005/0050190 A1 | 3/2005 | Dube |
| 2005/0060402 A1 | 3/2005 | Oyadomari et al. |
| 2005/0060403 A1 | 3/2005 | Bernstein et al. |
| 2005/0078606 A1 | 4/2005 | Bernstein et al. |
| 2005/0078692 A1 | 4/2005 | Gregson |
| 2005/0085259 A1 | 4/2005 | Conner et al. |
| 2005/0114083 A1 | 5/2005 | Bullis |
| 2005/0120269 A1 | 6/2005 | Larson |
| 2005/0166023 A1 | 7/2005 | Kasako et al. |
| 2005/0172161 A1 | 8/2005 | Cruz et al. |
| 2005/0185597 A1 * | 8/2005 | Le et al. ......................... 370/254 |
| 2005/0185658 A1 | 8/2005 | Kamiwada |
| 2005/0232284 A1 * | 10/2005 | Karaoguz et al. .............. 370/401 |
| 2005/0232291 A1 | 10/2005 | Brown et al. |
| 2005/0249214 A1 | 11/2005 | Peng |
| 2005/0254488 A1 | 11/2005 | Huang |
| 2005/0257104 A1 | 11/2005 | Wood |
| 2005/0260982 A1 | 11/2005 | Ko et al. |
| 2006/0058982 A1 | 3/2006 | Yamada et al. |
| 2006/0095174 A1 | 5/2006 | Sonnenrein et al. |
| 2006/0101271 A1 | 5/2006 | Thomas |
| 2006/0117300 A1 | 6/2006 | Puthukattukaran et al. |
| 2006/0198312 A1 | 9/2006 | Schondelmayer et al. |
| 2006/0198318 A1 | 9/2006 | Schondelmayer et al. |
| 2006/0198319 A1 | 9/2006 | Schondelmayer et al. |
| 2006/0200658 A1 * | 9/2006 | Penkethman ..................... 713/2 |
| 2006/0200708 A1 | 9/2006 | Gentieu et al. |
| 2006/0200711 A1 | 9/2006 | Schondelmayer et al. |
| 2006/0205398 A1 | 9/2006 | Seckendorf et al. |
| 2006/0211415 A1 * | 9/2006 | Cassett et al. .................. 455/423 |
| 2006/0217115 A1 * | 9/2006 | Cassett et al. .................. 455/423 |
| 2006/0217116 A1 * | 9/2006 | Cassett et al. .................. 455/423 |
| 2006/0230134 A1 | 10/2006 | Qian et al. |
| 2006/0230312 A1 | 10/2006 | Nichols et al. |
| 2006/0246845 A1 | 11/2006 | Lawson et al. |
| 2006/0264178 A1 | 11/2006 | Noble et al. |
| 2007/0086351 A1 | 4/2007 | Noble et al. |
| 2007/0087741 A1 | 4/2007 | Noble et al. |
| 2007/0087771 A1 | 4/2007 | Noble et al. |
| 2007/0088981 A1 | 4/2007 | Noble et al. |
| 2007/0099567 A1 * | 5/2007 | Chen et al. ..................... 455/41.2 |
| 2007/0146782 A1 * | 6/2007 | Lehotsky et al. ............. 358/1.15 |

| | | | | |
|---|---|---|---|---|
| 2007/0287450 | A1* | 12/2007 | Yang et al. | 455/433 |
| 2008/0008128 | A1* | 1/2008 | Nagarajan et al. | 370/331 |
| 2009/0254650 | A1 | 10/2009 | Sheppard | |

FOREIGN PATENT DOCUMENTS

| | | |
|---|---|---|
| WO | 2005/018162 A1 | 2/2005 |

OTHER PUBLICATIONS

U.S. Appl. No. 10/228,212, filed Aug. 26, 2002, Dubé et al.
U.S. Appl. No. 10/307,272, filed Nov. 27, 2002, Bain et al.
U.S. Appl. No. 10/424,361, filed Apr. 25, 2003, Foster et al.
U.S. Appl. No. 10/424,363, filed Apr. 25, 2003, Bain et al.
U.S. Appl. No. 10/424,364, filed Apr. 25, 2003, Bain et al.
U.S. Appl. No. 10/448,670, filed May 30, 2003, Cicchetti et al.
U.S. Appl. No. 10/448,827, filed May 30, 2003, Garcia et al.
U.S. Appl. No. 10/764,218, filed Jan. 23, 2004, Durham et al.
U.S. Appl. No. 11/344,829, filed Feb. 1, 2006, Lawson et al.
U.S. Appl. No. 11/344,883, filed Feb. 1, 2006, Schondelmayer et al.
U.S. Appl. No. 11/344,892, filed Feb. 1, 2006, Schondelmayer et al.
U.S. Appl. No. 11/344,893, filed Feb. 1, 2006, Schondelmayer et al.
U.S. Appl. No. 11/345,202, filed Feb. 1, 2006, Schondelmayer et al.
U.S. Appl. No. 11/537,590, filed Sep. 29, 2006, Noble et al.
U.S. Appl. No. 11/537,595, filed Sep. 29, 2006, Noble et al.
U.S. Appl. No. 11/537,599, filed Sep. 29, 2006, Noble et al.
U.S. Appl. No. 11/537,602, filed Sep. 29, 2006, Noble et al.
U.S. Appl. No. 11/930,677, filed Oct. 31, 2007, Noble et al.
U.S. Appl. No. 11/344,883, Mar. 10, 2010, Office Action.
U.S. Appl. No. 11/930,677, Jun. 9, 2010, Office Action.
United States Patent and Trademark Office, U.S. Appl. No. 11/344,892, Office Action mailed Aug. 18, 2009.
United States Patent and Trademark Office, U.S. Appl. No. 11/344,883, Office Action mailed Oct. 2, 2009.
United States Patent and Trademark Office, U.S. Appl. No. 11/685,548, Office Action mailed Nov. 2, 2009.
United States Patent and Trademark Office, U.S. Appl. No. 11/348,745, Office Action mailed Aug. 3, 2009.
United States Patent and Trademark Office, U.S. Appl. No. 11/413,829, Office Action mailed Sep. 1, 2009.
United States Patent and Trademark Office, U.S. Appl. No. 11/413,829, Amendment "B" filed Jan. 25, 2010 in response to Office Action mailed Sep. 1, 2009.
United States Patent and Trademark Office, U.S. Appl. No. 11/413,829, Office Action mailed Feb. 19, 2010.
United States Patent and Trademark Office, U.S. Appl. No. 11/413,829, Amendment "C" filed Jun. 21, 2010 in response to Office Action mailed Feb. 19, 2010.
United States Patent and Trademark Office, U.S. Appl. No. 11/685,551, Office Action mailed Nov. 3, 2009.
United States Patent and Trademark Office, U.S. Appl. No. 11/537,590, Notice of Allowance mailed Aug. 28, 2009.
United States Patent and Trademark Office, U.S. Appl. No. 11/344,893, Office Action mailed Jul. 20, 2009.
United States Patent and Trademark Office, U.S. Appl. No. 11/204,920, Office Action mailed Jun. 9, 2009.
United States Patent and Trademark Office, U.S. Appl. No. 11/134,786, Office Action mailed May 12, 2009.
United States Patent and Trademark Office, U.S. Appl. No. 11/134,786, Amendment "B" filed Nov. 12, 2009 in response to Office Action mailed May 12, 2009.
United States Patent and Trademark Office, U.S. Appl. No. 11/134,786, Office Action mailed Dec. 4, 2009.
United States Patent and Trademark Office, U.S. Appl. No. 11/537,599, Office Action mailed Sep. 15, 2009.
United States Patent and Trademark Office, U.S. Appl. No. 11/744,591, Office Action mailed Jul. 31, 2009.
United States Patent and Trademark Office, U.S. Appl. No. 11/744,591, Amendment "A" filed Feb. 1, 2010 in response to Office Action mailed Jul. 31, 2009.
United States Patent and Trademark Office, U.S. Appl. No. 11/744,591, Office Action mailed May 10, 2010.
United States Patent and Trademark Office, U.S. Appl. No. 11/345,202, Office Action mailed Jul. 2, 2009.
United States Patent and Trademark Office, U.S. Appl. No. 11/279,360, Office Action mailed Jun. 11, 2009.
United States Patent and Trademark Office, U.S. Appl. No. 11/537,602, Office Action mailed Sep. 10, 2009.
United States Patent and Trademark Office, U.S. Appl. No. 11/537,595, Office Action mailed Sep. 16, 2009.

* cited by examiner

IDENTIFYING AND RESOLVING PROBLEMS IN WIRELESS DEVICE CONFIGURATIONS

CROSS-REFERENCE TO RELATED APPLICATIONS

This application claims priority to U.S. Provisional Patent Application Ser. No. 60/830,220, filed on Jul. 12, 2006, which is incorporated herein by reference in its entirety.

BACKGROUND OF THE INVENTION

1. The Field of the Invention

The present invention relates to wireless device configurations. More particularly, embodiments of the invention relate to systems and methods for identifying and resolving problems in wireless device configurations.

2. The Related Technology

Wireless networks are becoming increasingly popular in both public and private networking environments. This increasing popularity has resulted in a proliferation of wireless networking equipment manufacturers. Wireless networking equipment manufacturers produce both hardware and software that enable wireless network users to connect to wireless networks using wireless devices. For example, many wireless networking equipment manufacturers produce equipment that is configured to enable wireless communication using one or more IEEE wireless networking standards such as 802.11b, 802.11g, 802.11a, 802.16, 802.11n, 802.15.1, 802.15.3, and 802.15.3a.

One problem with current wireless networking equipment is that hardware and software incompatibilities often arise between wireless devices produced by different manufacturers. These incompatibilities can cause a wireless device that functions well with one manufacturer's wireless devices to malfunction with a different manufacturer's wireless devices. Although incompatibilities can often be overcome by changing the wireless device configuration of the wireless device, it can be time consuming and difficult for the wireless device user or support person to research and implement the configuration changes that are necessary in order to overcome the malfunction-causing incompatibility.

BRIEF SUMMARY OF SOME EXAMPLE EMBODIMENTS

In general, example embodiments of the invention are concerned with systems and methods for identifying and resolving problems in wireless device configurations.

In one example embodiment, a method for resolving wireless device configuration problems includes various acts including identifying all wireless devices that are wired to a network, retrieving configuration information from each wireless device, retrieving wireless device incompatibility information and corresponding configuration solutions for each wireless device, attempting to contact each wireless device over one or more wireless communication channels in order to determine if one or more wireless capabilities of each wireless device are functioning properly, and determining that the incompatibility information of one of the wireless devices with a malfunctioning wireless capability conflicts with the configuration information of one or more of the wireless devices.

In another example embodiment, a method for resolving wireless device configuration problems includes various acts including identifying a target wireless network, identifying a wireless device that is wirelessly connected to a servicing wireless network, retrieving configuration information from the wireless device, retrieving wireless device incompatibility information and corresponding configuration solutions for the wireless device and the target wireless network, and determining that the incompatibility information of the wireless device conflicts with the configuration information of the wireless device.

These and other aspects of example embodiments of the present invention will become more fully apparent from the following description and appended claims.

BRIEF DESCRIPTION OF THE DRAWINGS

To further clarify aspects of the present invention, a more particular description of the invention will be rendered by reference to specific embodiments thereof which are disclosed in the appended drawings. It is appreciated that these drawings depict only example embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Figure 1:
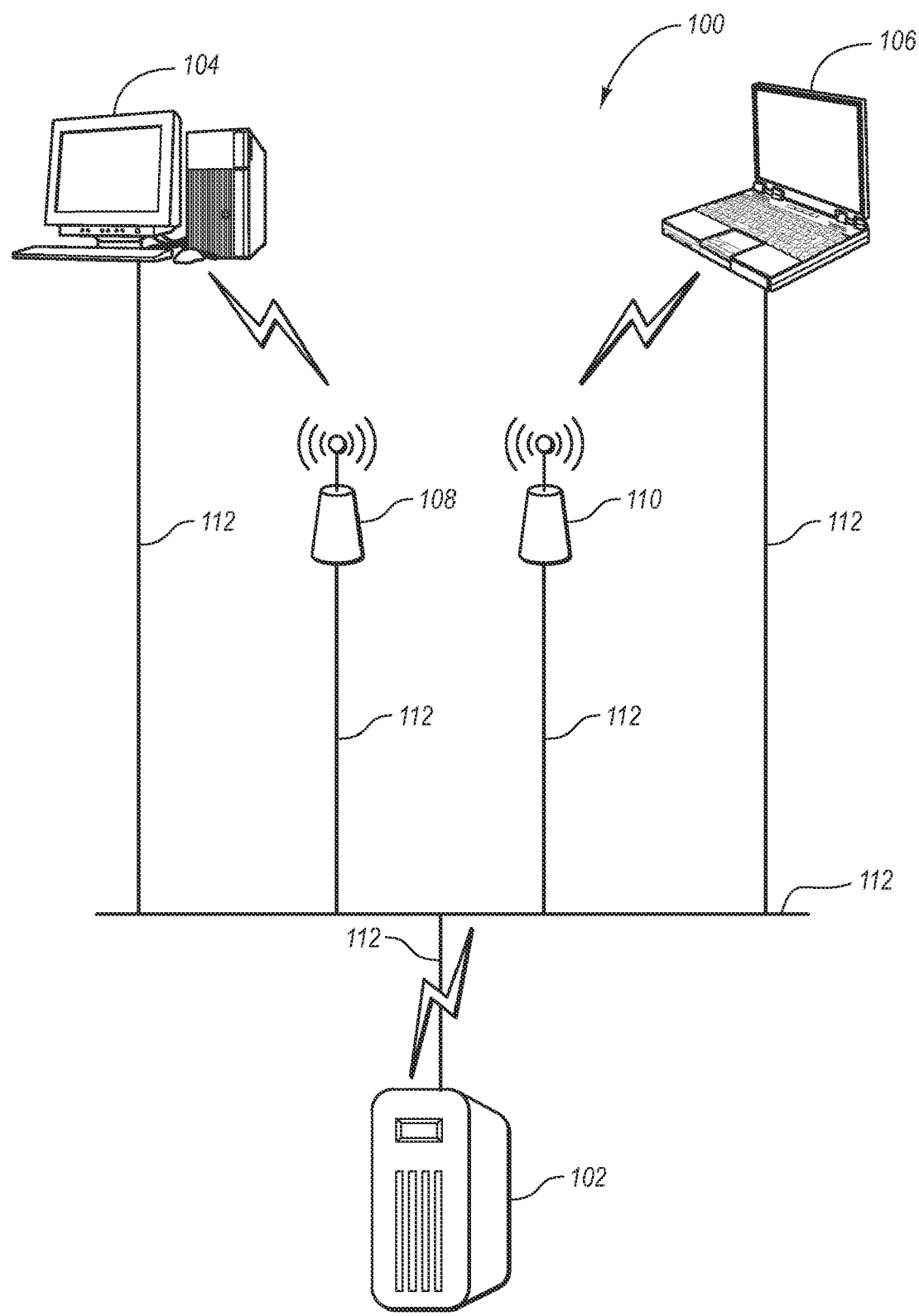
FIG. 1 discloses an example network wherein aspects of one example embodiment of the present invention can be implemented.

Example embodiments of the present invention relate to systems and methods for identifying and resolving problems in wireless device configurations in a wireless network. The term "wireless" as used herein refers to technology that enables two or more wireless devices to communicate via electromagnetic waves transmitted over free space. The term "wireless network" as used herein refers to technology that uses wireless technology to communicate using one or more network protocols. Example network protocols with which example embodiments of the invention disclosed herein can be practiced include, but are not limited to, IEEE standards 802.11b, 802.11g, 802.11a, 802.16, 802.11n, 802.15.1, 802.15.3, and 802.15.3a.

The term "wireless device" as used herein refers to any hardware device that is designed to communicate wirelessly with other hardware devices. A wireless device typically includes software and/or firmware which is/are designed to enable the wireless device to communicate wirelessly with other wireless devices. Wireless devices can also be "wired," or designed to be connected to other hardware devices with network cabling or other cabling. Wireless devices can, therefore, be designed to communicate in both a wireless network environment and a wired networking environment, at times simultaneously. Examples of wireless devices include, but are not limited to, laptop computers, personal digital assistants, cellular telephones, desktop computers, network servers, network printers, and wireless access points.

Wireless devices are often designed to communicate using a common network protocol, such as IEEE 802.11g for instance. However, because of one or more differences between their respective configurations, the wireless devices are sometimes "incompatible" such that wireless communication therebetween over the common network protocol is not possible. For instance, although two wireless devices may be designed to communicate over IEEE 802.11g, the particular configuration of one or both wireless devices may make the wireless devices incompatible such that communication over IEEE 802.11g is not possible. This incompatibility can often be overcome by changing the wireless device configuration of one or both of the wireless devices. The term "wireless device configuration" as used herein refers to the particular combination of hardware, operating system, drivers, software, firmware, patches, setup and other settings of a wireless device.

When an incompatibility between two wireless devices is discovered, information regarding that incompatibility is often made public. The term "incompatibility information" as used herein refers to detailed information about known incompatibilities between two or more wireless devices. Incompatibility information is often published along with corresponding configuration solutions by the respective manufacturers of the two or more wireless devices. The term "configuration solutions" as used herein refers to detailed information about how to resolve incompatibilities between two or more wireless devices such that wireless communication between the two or more wireless devices over a common network protocol is made possible. Configuration solutions can include changes to the wireless device configuration of one or more of the wireless devices affected by the incompatibilities. Incompatibility information and corresponding configuration solutions can be published in a variety of forums such as, for example, the websites of the manufacturers of the wireless devices affected by the incompatibilities.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

In the following description, numerous specific details are set forth in order to provide a thorough understanding of example embodiments of the present invention. It will be obvious, however, to one skilled in the art that the present invention may be practiced without these specific details. In other instances, well-known aspects of network systems have not been described in great detail in order to avoid unnecessarily obscuring the present invention.

I. Example Network Environments

FIG. 1 illustrates an example network 100 wherein aspects of example embodiments of the present invention can be implemented. The network 100 includes a network server 102, a desktop computer 104, and a laptop computer 106. The network 100 also includes wireless access points (WAPs) 108 and 110. Each of the network server 102, desktop computer 104, laptop computer 106, WAP 108, and WAP 110 is designed to communicate wirelessly over a common network protocol. For example, each of the network server 102, desktop computer 104, laptop computer 106, WAP 108 and WAP 110 can be designed to communicate according to the IEEE 802.11g network protocol. Since each of the network server 102, desktop computer 104, laptop computer 106, WAP 108, and WAP 110 is a hardware device that is designed to communicate wirelessly with other hardware devices, each fits within the definition of a "wireless device." Each of the network server 102, desktop computer 104, laptop computer 106, WAP 108, and WAP 110 are merely representative of a plurality of wireless devices that can be included in the example network 100. Thus, the type and number of wireless devices in the example network 100 can vary depending on the needs of a particular application.

As illustrated in FIG. 1, both wired and wireless communication is possible between the wireless devices of network 100. Specifically, wired communication is made possible because of the interconnection of the wireless devices 102-110 by network cabling 112. Likewise, since each of the wireless devices 102-110 is designed to communicate wirelessly using the IEEE 802.11g network protocol, where no incompatibilities between the wireless devices 102-110 are present, each of the wireless devices 102-110 can communicate wirelessly with each other. The network server 102 is designed to communicate wirelessly with the desktop computer 104 and the laptop 106 using the IEEE 802.11g network protocol. However, where the network server 102 is not located in close physical proximity to the desktop computer 104, the laptop 106, and the WAPs 108 and 110, the network server 102 can communicate with the desktop computer 104 and the laptop 106 by first sending a message over the network cabling 112 to the WAP 108 or the WAP 110, which then relays the message wirelessly to the desktop computer 104 or the laptop 106. Thus a combination of wired and wireless communication can be used to overcome distance limitations associated with the IEEE 802.11g or other network protocol.

As illustrated in FIG. 1, the desktop computer 104 communicates with the network server 102 using wireless communication through the WAPs 108 and 110. The desktop computer 104 is also capable of communicating with the network server 102 over the network cabling 112. However, while it is likewise capable of communicating with the network server 102 over the network cabling 112, the laptop 106 in the illustrated configuration is not currently communicating properly with the network server 102 using wireless communication through the WAPs 102 and 110. Where a wireless device is in wired communication with a network but is unable to communicate wirelessly, as is the case here with the laptop 106, the example systems and methods of the present invention are particularly useful, as described in more detail in connection with FIGS. 5 and 6 below.

Figure 2:
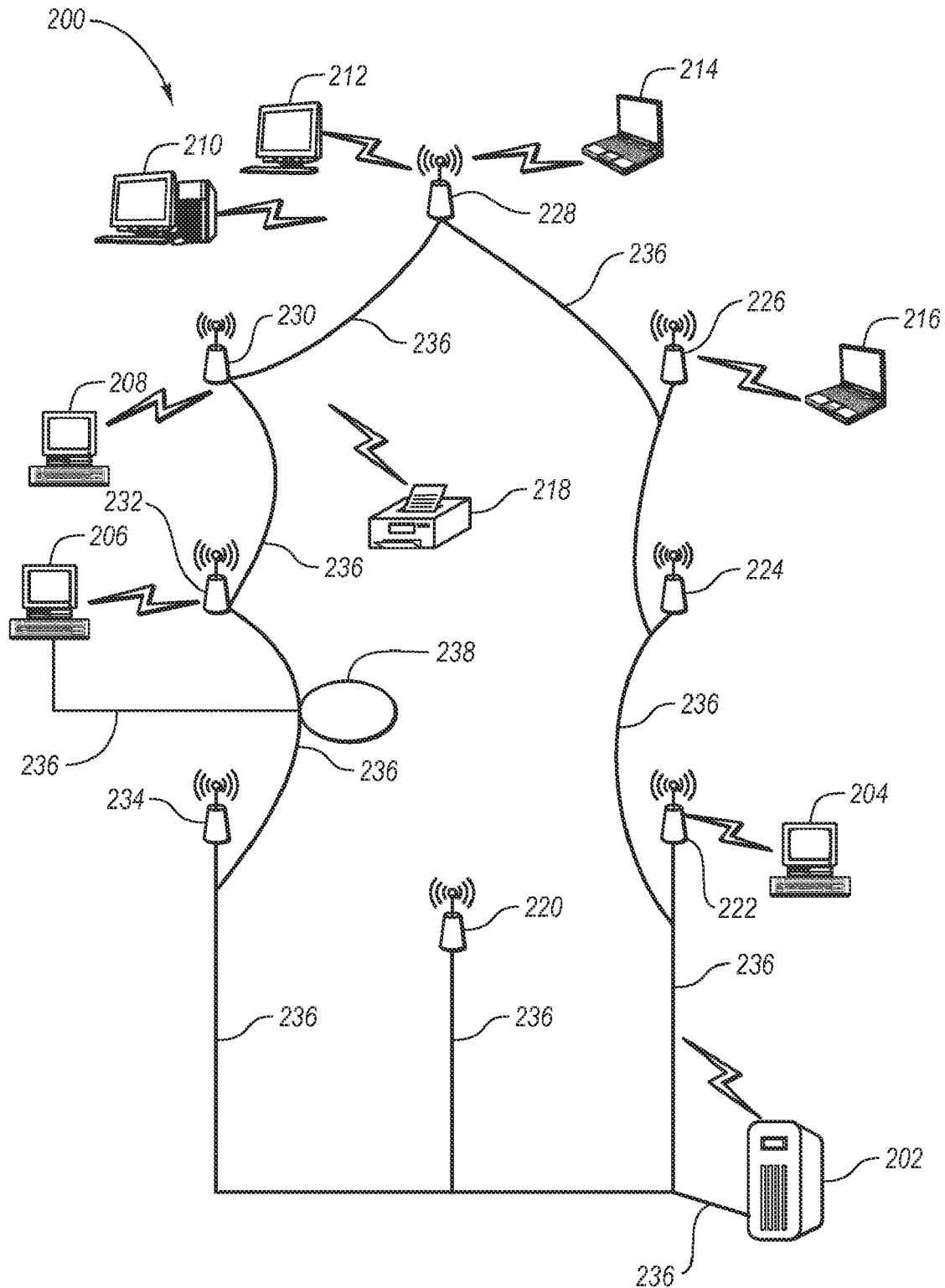
FIG. 2 discloses another example network wherein aspects of one example embodiment of the present invention can be implemented.

FIG. 2 illustrates another example network 200 wherein aspects of example embodiments of the present invention can be implemented. The network 200 includes a network server 202, desktop computers 204-212, laptop computers 214 and 216, and a network printer 218. The network 200 also includes WAPs 220-234. Each of the network server 202, desktop computer 204-212, laptop computers 214 and 216, network printer 218, and WAPs 220-234 are wireless devices designed to communicate according to the IEEE 802.11b network protocol.

As illustrated in FIG. 2, both wired and wireless communication is possible between certain of the wireless devices of the network 200. Specifically, wired communication between the network server 202 and the desktop computer 206 is made possible because of the interconnection of the network server 202 and the desktop computer 206 by the network cabling 236. Likewise, since each of the network server 202 and the desktop computer 206 is designed to communicate wirelessly using the IEEE 802.11b network protocol, where no incompatibilities between the network server and the desktop computer 206 are present, each of the network server 202 and the desktop computer 206 can communicate wirelessly with each other. Where the network server 202 is not located in close physical proximity to the desktop computer 206, and the WAP 232 is located in close physical proximity to the desktop computer 206, the network server 202 can communicate with the desktop computer 206 by first sending a message over the network cabling 236 to the WAP 232, which then relays the message wirelessly to the desktop computer 206. Thus a combination of wired and wireless communication can be used to overcome distance limitations associated with the IEEE 802.11b network protocol.

As illustrated in FIG. 2, the desktop computer 206 communicates with the network server 202 using wireless communication through the WAP 232. The desktop computer 206 is also capable of communicating with the network server 202 over the network cabling 236. However, the network printer 218 in the illustrated configuration is not currently wirelessly communicating with the network server 202, either directly or through any of the WAPs 220-234. In this situation, a network administrator can temporarily wire the network printer 218 to the network 200 in order to have the network printer 218 in wired communication with the network 200. For example, a ceiling drop 238 can be used to run a length of the network cabling 236 to the network printer 218. Where a wireless device is in wired communication with a network but is unable to communicate wirelessly, the example systems and methods of the present invention are particularly useful, as described in more detail in connection with FIGS. 5 and 6 below.

Figure 3:
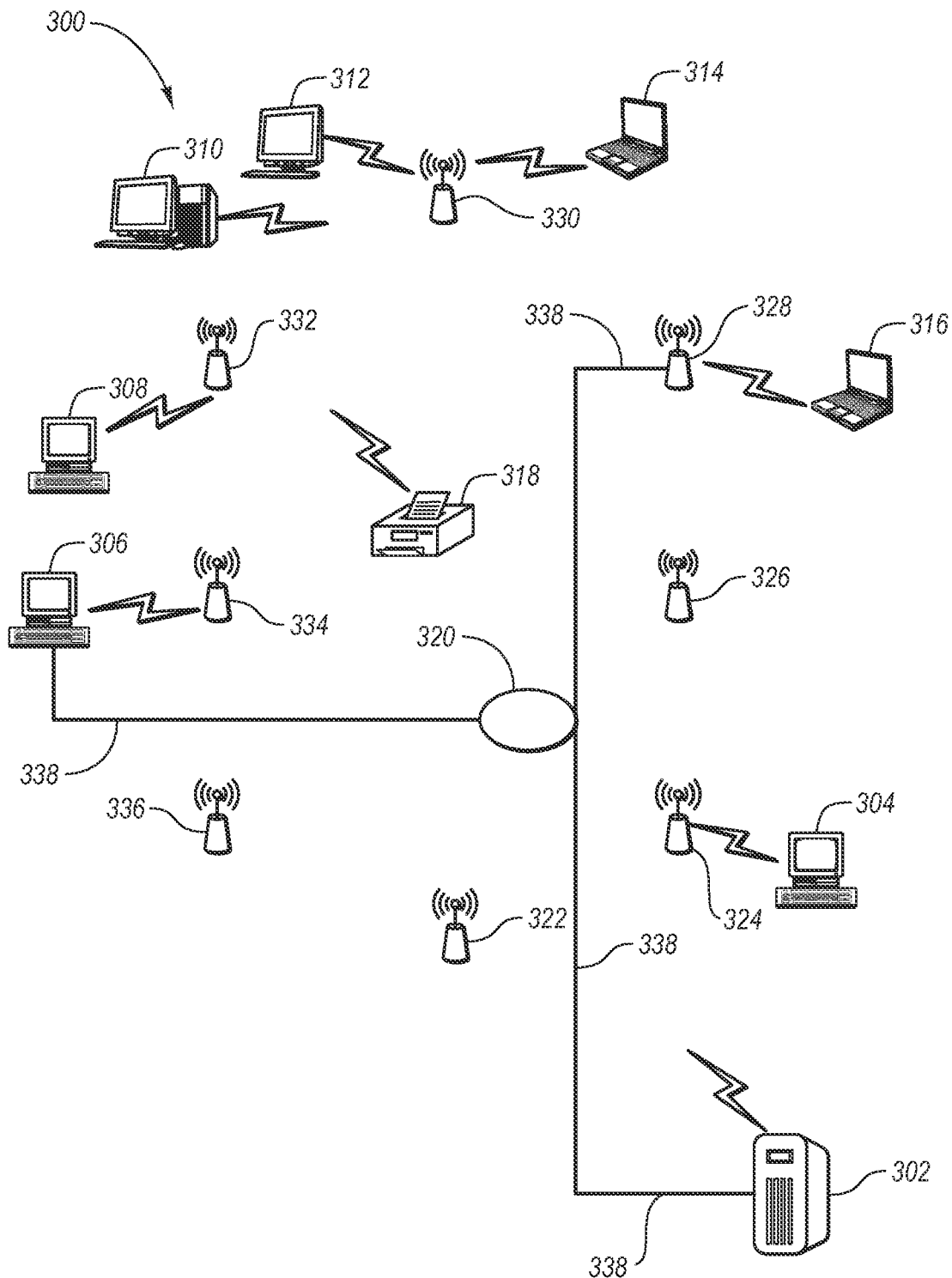
FIG. 3 discloses another example network wherein aspects of one example embodiment of the present invention can be implemented.

FIG. 3 illustrates another example network 300 wherein aspects of example embodiments of the present invention can be implemented. The network 300 includes a network server 302, desktop computers 304-312, laptop computers 314 and 316, and a network printer 318. The network 300 also includes a ceiling drop 320. The network 300 also includes WAPs 322-336. Each of the network server 302, desktop computer 304-312, laptop computers 314 and 316, network printer 318, and WAPs 322-336 are wireless devices capable of communicating according to the IEEE 802.16 network protocol.

As illustrated in FIG. 3, both wired and wireless communication is possible between certain of the wireless devices of the network 300. Specifically, wired communication between the network server 302 and the desktop computer 306 is made possible because of the interconnection of the network server 302 and the desktop computer 306 by network cabling 338. Likewise, since each of the network server 302 and the desktop computer 306 is designed to communicate wirelessly using the IEEE 802.16 network protocol, where no incompatibilities between the network server 302 and the desktop computer 306 are present, each of the network server 302 and the desktop computer 306 can communicate wirelessly with each other. Likewise, the network server 302 can communicate with the desktop computer 306 by first sending a message over the network cabling 338 to the WAP 334, which then relays the message wirelessly to the desktop computer 306. Thus a combination of wired and wireless communication can be used in the network 300.

As illustrated in FIG. 3, the network 300 is intended to function as a totally wireless network. Even absent the network cabling 338, the network server 302 can facilitate communication between each of the network server 302, desktop computers 304-312, laptop computers 314 and 316, network printer 318, and WAPs 322-336. In particular, each of the WAPs 322-336 is strategically located with respect to the location of the network server 302 such that no network cabling is required to interconnect the network server 302 and each of the WAPs 322-336. Each of the WAPs 322-336 is capable of relaying a signal between any two of the wireless devices 302-336. The network cabling 338 is only necessary in the network 300 when the network server 302 is unable to communicate wirelessly with one or more of the wireless devices 304-318 and 322-336, or when any of the wireless devices 304-318 and 322-336 is unable to communicate wirelessly with any other of the wireless devices 304-318 and 322-336. When wireless communication ceases in an unintended manner between two or more of the wireless devices 304-318 and 322-336, a network administrator can temporarily run a network cable between the problematic wireless devices and the network server 302. For example, the ceiling drop 320 can be used to run a length of the network cabling 338 to the problematic wireless device. In this manner, the ceiling drop 320 can be used to enable wired communication between the problematic wireless device and the network server 302. Where a wireless device is in wired communication with a network but is unable to communicate wirelessly, the example systems and methods of embodiments of the present invention are particularly useful, as described in more detail in connection with FIGS. 5 and 6 below.

Figure 4:
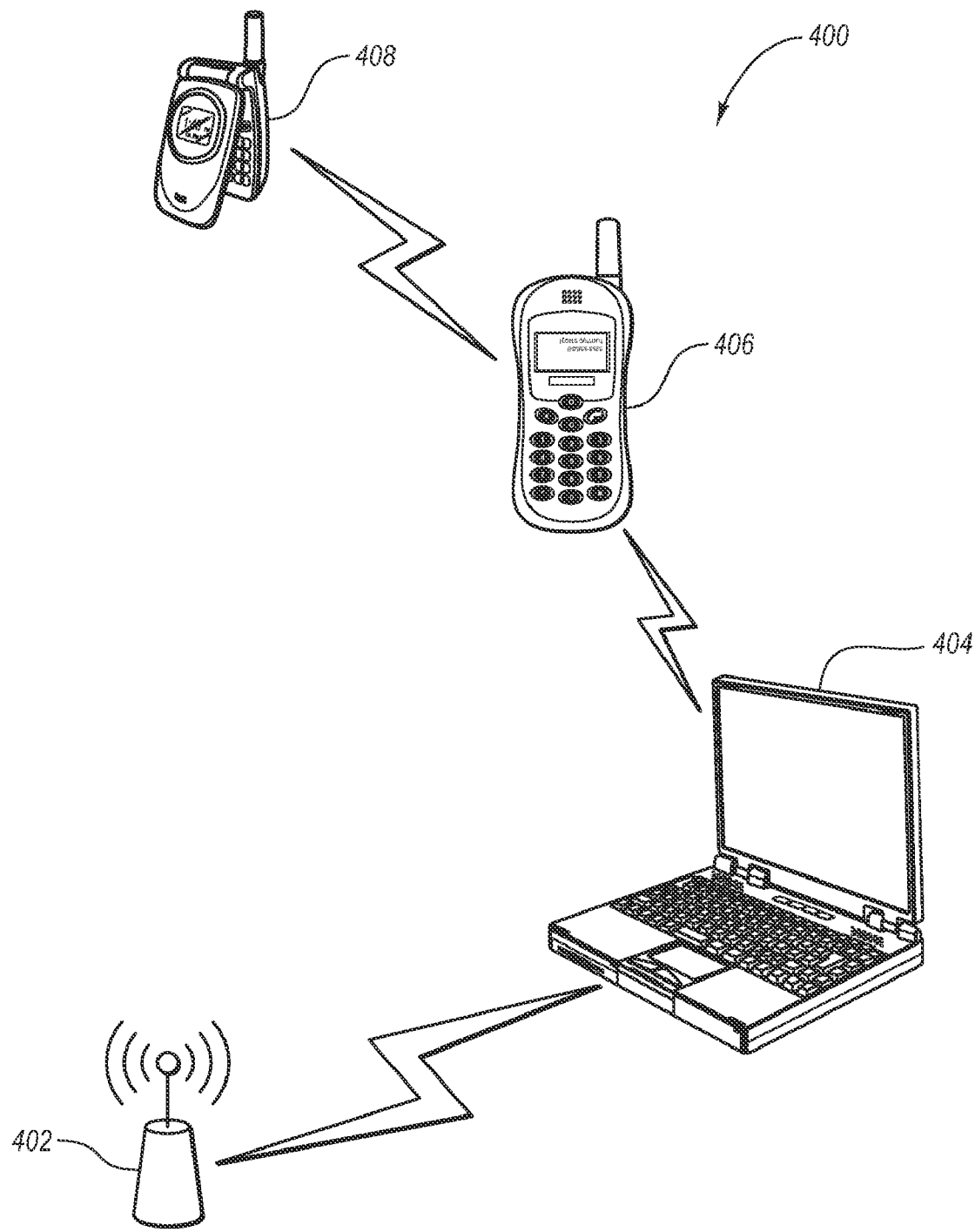
FIG. 4 discloses another example network wherein aspects of one example embodiment of the present invention can be implemented.

FIG. 4 illustrates another example network 400 wherein aspects of example embodiments of the present invention can be implemented. The network 400 includes a WAP 402, a laptop computer 404, and cellular phones 406 and 408. The WAP 402 and the laptop computer 404 are wireless devices designed to communicate according to the IEEE 802.11a network protocol. The laptop computer 404 is also designed to communicate using the IEEE 802.15.1 network protocol. The cellular phones 406 and 408 are wireless devices designed to communicate according to both the IEEE 802.15.1 network protocol as well as the Global System for Mobile Communications (GSM) standard. The cellular phones 406 and 408 are not limited to the GSM standard for cellular communication, but could also be designed to communicate using any other cellular communication standards including, but not limited to, TDMA, CDMA, GPRS, EV-DO, and UMTS.

As illustrated in FIG. 4, only wireless communication is possible between the devices shown in the network 400, since the network 400 does not include any network cabling. When the laptop computer 404 comes within range of the WAP 402, a user of the laptop computer 404 would expect the laptop computer 404 to be able to communicate wirelessly with the WAP 402 using the IEEE 802.11a network protocol. However, due to incompatibilities between the laptop computer 404 and the WAP 402, wireless communication between these two wireless devices may not initially be possible. As long as the laptop computer 404 is able to communicate with the cellular telephone 406 using the IEEE 802.15.1 network protocol, and the cellular telephone 406 is able to communicate with the cellular telephone 408 using the GSM standard, the example systems and methods of embodiments of the present invention are particularly useful, as described in more detail in connection with FIGS. 5 and 7 below.

II. Example System for Resolving Wireless Device Configurations Problems

Figure 5:
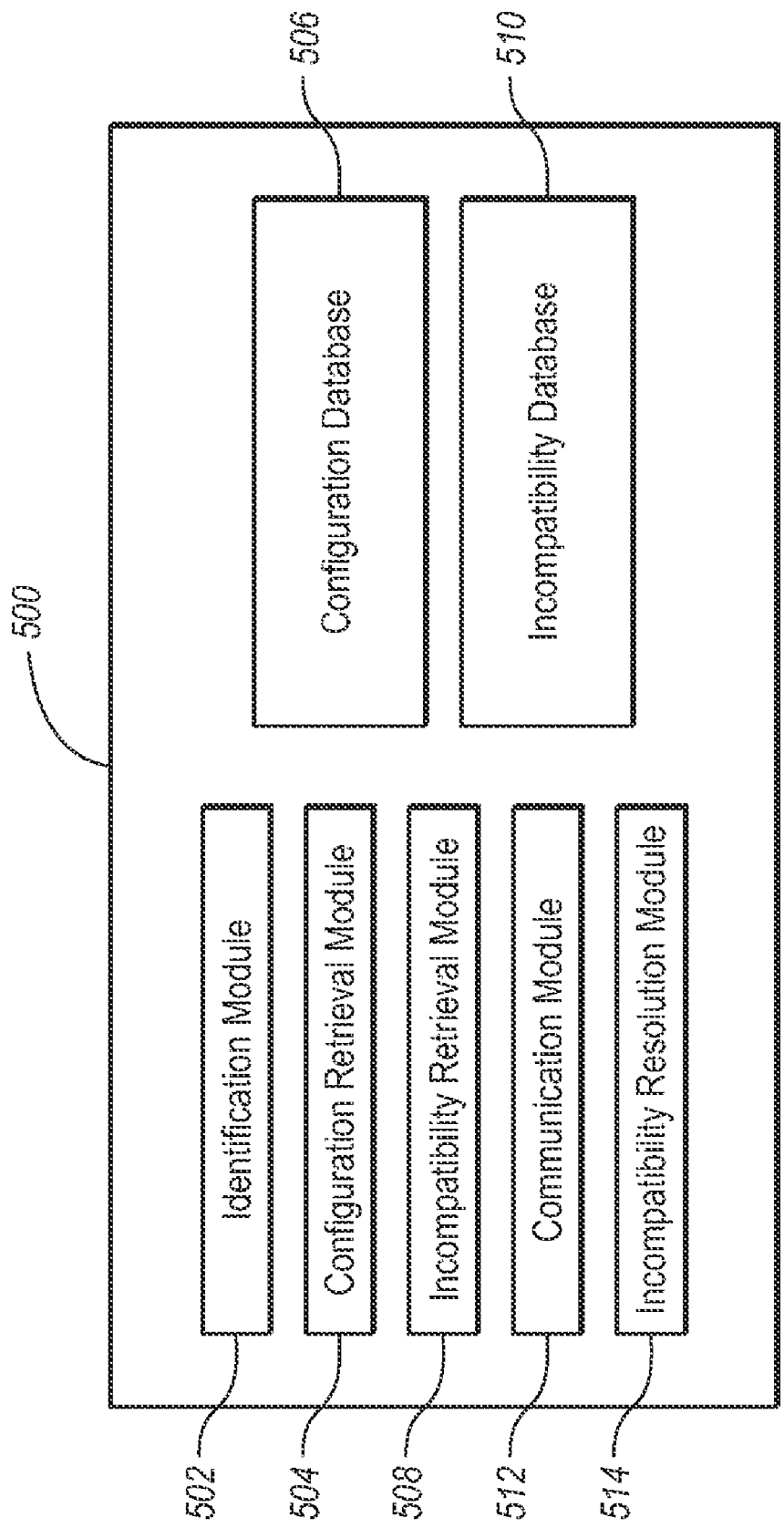
FIG. 5 discloses a block diagram of an example system for resolving wireless device configuration problems.

FIG. 5 illustrates an example system 500 for resolving wireless device configuration problems, such as the situations briefly discussed above. The system 500 can be implemented in hardware, software, or a combination of hardware and software. For example, the system 500 can be implemented as a software application that runs on a network server in a computer network, such as the network servers 102, 202, and 302 of the networks 100, 200, and 300 of FIGS. 1, 2, and 3, respectively. Alternatively, the system 500 can be implemented as a software application that runs on mobile device of a network administrator, such as the cellular phone 408 of the network 400 of FIG. 4. Since the system 500 is designed to analyze a network, the system 500 may properly be categorized as an "analyzer."

The system 500, in one embodiment, is designed to communicate over a variety of different network protocols, and has access to several types of network information. For example, the system 500 is capable of manipulating and handling data related to: HTTP to Wireless router IP addresses (the default for which is: 192.168.0.1), Point-to-Point Protocol over Ethernet (PPPoE), service set identifier (SSID) (which may be broadcast disabled and therefore not seen), Wired Equivalent Privacy (WEP) (which, when enabled for a 64 k data transfer rate, is most likely associated with an easy key with 10 HEX digits), Maximum Transmission Unit (MTU) size (which has a maximum of 1492 k for PPPoE, and a maximum of 1500 k for Dynamic/static IP address), Packet Internet Groper (PING) (which is a utility to determine whether a specific IP address is accessible), and Domain Name System (DNS) relay (V3.35).

The system 500 is able to communicate using with both wired and wireless connections. The system 500 is also able to communicate with devices having static IP addresses or static Dynamic Host Configuration Protocol (DHCP), and dynamic DHCP. The system 500 will also be aware of, and capable of reconfiguring devices according to certain work-arounds. These work-arounds enable wireless devices made by different manufacturers to communicate. The system 500 will also gather information on the physical layer (PHY). The PHY defines parameters such as data rates, modulation method, signaling parameters, and transmitter/receiver synchronization. The system 500 also understands and is able to communicate where the wireless physical layer is split into two parts, called the Physical Layer Convergence Protocol (PLCP) and the Physical Medium Dependent (PMD) sublayer. The system 500 can also communicate using port-based authentication using an 802.1X standard. The system 500 can also communicate using WEP, WPA, WPA2 encryption methods, as well as AES.

The system 500 of FIG. 5 includes an identification module 502, a configuration retrieval module 504, a configuration database 506, an incompatibility retrieval module 508, an incompatibility database 510, a communication module 512, and an incompatibility resolution module 514. In an example method 600, discussed below, the identification module 502 is operative to identify all wireless devices that are wired to a network. The configuration retrieval module 504 is operative to retrieve configuration information from each wireless device wired to the network. The configuration database 506 is operative to store the configuration information. The incompatibility retrieval module 508 is operative to retrieve wireless device incompatibility information and corresponding configuration solutions. The incompatibility database 510 is operative to store the wireless device incompatibility information and the corresponding configuration solutions. The communication module 512 is operative to contact each wireless device over one or more wireless communication channels in order to determine if one or more wireless capabilities of each wireless device are functioning properly. The incompatibility resolution module 514 is operative to compare the configuration information stored in the configuration database 506 to the wireless device incompatibility information and corresponding configuration solutions stored in the incompatibility database 510 in order to automatically configure each malfunctioning wireless device according to one or more configuration solutions stored in the incompatibility database 510.

Alternatively, in an example method 700, discussed below, the identification module 502 is operative to identify a target wireless network and a wireless device that is wirelessly connected to a servicing wireless network. The configuration retrieval module 504 is operative to retrieve configuration information from the wireless device. The configuration database 506 is operative to store the configuration information. The incompatibility retrieval module 508 is operative to retrieve wireless device incompatibility information and corresponding configuration solutions for the wireless device and the target wireless network. The incompatibility database 510 is operative to store the wireless device incompatibility information and the corresponding configuration solutions. The incompatibility resolution module 514 is operative to compare the configuration information stored in the configuration database 506 to the wireless device incompatibility information and corresponding configuration solutions stored in the incompatibility database 510 in order to automatically configure the wireless device according to one or more configuration solutions stored in the incompatibility database 510.

The system 500 of FIG. 5 is only one example of a system that can implement the methods disclosed herein. Other systems and variations on the system 500 could also implement the methods disclosed herein. For example, the system 500 could have more modules or fewer modules that perform the same functions as the modules illustrated in the system 500. Likewise, the storage functionality of the databases 506 and 510 could be accomplished using only one database, or more than two databases. As used herein, the term "database" refers generally to any means for storing data, and could include hardware, software, or a combination of hardware and software. For example, the databases 506 and 510 could be implemented in volatile or non-volatile memory or on a disk or series of disks.

III. Example Method for Resolving Wireless Device Configuration Problems

Figure 6:
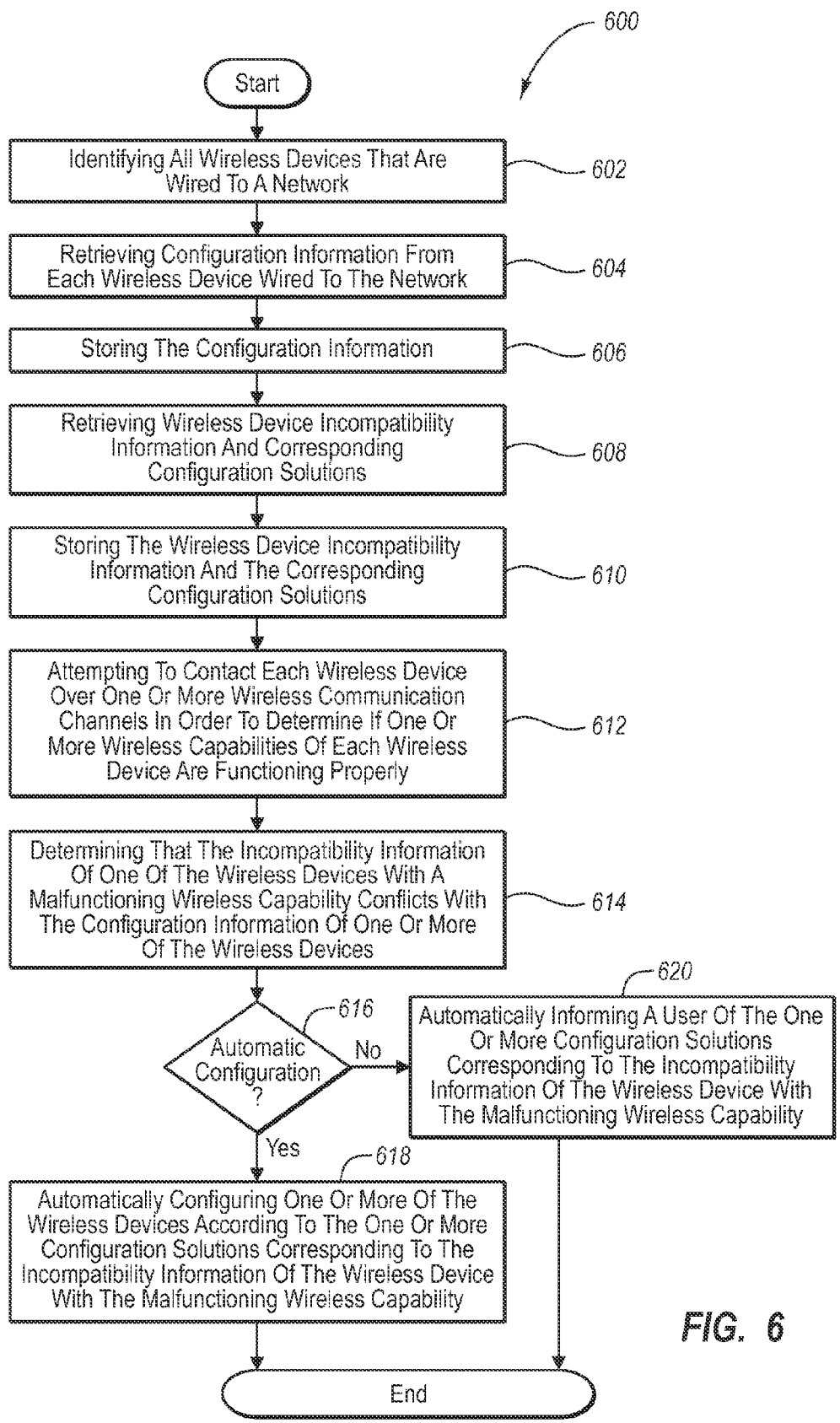
FIG. 6 discloses an example method for resolving wireless device configuration problems.

Turning now to FIG. 6, a method 600 for resolving wireless device configuration problems is disclosed. The method 600 includes identifying all wireless devices that are wired to a network (602), retrieving configuration information from each wireless device wired to the network (604), storing the configuration information (606), retrieving wireless device incompatibility information and corresponding configuration solutions (608), storing the wireless device incompatibility information and the corresponding configuration solutions (610), attempting to contact each wireless device over one or more wireless communication channels in order to determine if one or more wireless capabilities of each wireless device are functioning properly (612), determining that the incompatibility information of one of the wireless devices with a malfunctioning wireless capability conflicts with the configuration information of one or more of the wireless devices (614), determining whether the method 600 is set for automatic configuration (616), and, depending on the result of act 616, either automatically configuring one or more of the wireless devices according to the one or more configuration solutions corresponding to the incompatibility information of the wireless device with the malfunctioning wireless capability (618) or automatically informing a user of the one or more configuration solutions corresponding to the incompatibility information of the wireless device with the malfunctioning wireless capability (620). Acts 602-620 of example method 600 do not necessarily have to be performed in the order shown in FIG. 6. For example, acts 608 and 610 could be performed before or after any of acts 602-606 or after act 612. Some of acts 602-620 of example method 600 shown in FIG. 6 can also be eliminated in some situations. For example, acts 606 and 610 could be eliminated where the other acts of the method 600 are performed in real time.

A first example of the method 600 will now be described in connection with FIGS. 1 and 5. In this example, the method 600 is performed by a software implementation of the system 500 that is running on the network server 102. At act 602, the identification module 502 identifies that the desktop computer 104, the laptop computer 106, the WAPs 108 and 110, as well as the network server 102 are wired to the network 100. This identification of all wireless devices that are wired to the network 100 can be accomplished by having the software application 500 running on a system administrator's account on the network server 102 so that the software application 500 has proper permissions on the network to access all wireless devices. This identification can further be accomplished by the software application 500 performing an IP search on the entire network 100, including all sub nets. This search can be accomplished using a network protocol suitable for the network cabling 112 such as, for example, Simple Network Management Protocol (SNMP). The software application 500 could then directly address each wireless device over the network cabling 112.

Continuing with the first example, at act 604, the configuration retrieval module 504 retrieves configuration information from the desktop computer 104, the laptop computer 106, the WAPs 108 and 110, and the network server 102. This configuration information can include information such as, but not limited to, wireless device name, wired IP address, wireless device manufacturer, wireless device model, wireless device revision, wireless device driver, wireless device protocol, and driver revision. The configuration information can also include information such as, for example, HTTP to Wireless router IP address, Point-to-Point Protocol over Ethernet (PPPoE), Service Set Identifier (SSID), Wired Equivalent Privacy (WEP), and Maximum Transmission Unit (MTU) size.

Continuing with the first example, at act 606, the configuration retrieval module 504 stores the configuration information for each of the desktop computer 104, the laptop computer 106, the WAPs 108 and 110, and the network server 102 in the configuration database 506. At act 608, the incompatibility retrieval module 508 retrieves wireless device incompatibility information and corresponding configuration solutions for each of the desktop computer 104, the laptop computer 106, the WAPs 108 and 110, and the network server 102. This incompatibility information and corresponding configuration solutions can be retrieved, for example, by connecting over the internet to the manufacturers' websites of each wireless device in the network 100. At act 610, the incompatibility retrieval module 508 stores the wireless device incompatibility information and the corresponding configuration solutions in the incompatibility database 510. This information can be indexed according to, for example, manufacturer, model, revision, driver, protocol, and/or patch.

Continuing with the first example, at act 612, the communication module 512 attempts to contact each of the desktop computer 104, the laptop computer 106, and the WAPs 108 and 110 over an IEEE 802.11g wireless communication channel in order to determine if one or more wireless capabilities of each wireless device are functioning properly. In this first example, at act 612 the communication module 512 will determine that all wireless capabilities of all wireless devices of the network 100 are functioning properly except for the laptop computer 106, which does not appear to be communicating wirelessly with any other wireless device in the wireless network 100.

Continuing with the first example, at act 614, the incompatibility resolution module 514 determines that the incompatibility information of laptop computer 106 conflicts with the configuration information of one or more of the wireless devices in the network 100. For example, at act 614, the incompatibility resolution module 514 compares the configuration information stored in the configuration database 506 for the laptop computer 106 and other wireless devices in the network 100 to the wireless device incompatibility information for the laptop computer 106 stored in the incompatibility database 510. If it is determined that the method 600 is set for automatic configuration at act 616, this comparison enables the incompatibility resolution module 514 at act 618 to automatically configure the malfunctioning laptop computer 106 according to one or more configuration solutions. For example, the incompatibility resolution module 514 might discover that a known incompatibility exists between an outdated wireless communication driver of the laptop computer 106 and the WAP 110, and that the corresponding configuration solution is to install an updated wireless communication driver onto the laptop computer 106. Therefore, at act 618, the incompatibility resolution module 514 can install the updated driver onto the laptop computer 106 and thereby automatically configure the laptop computer 106 to wirelessly communicate with the WAP 110. This first example illustrates how an incompatibility between the laptop computer 106 and the WAP 110 can be automatically resolved and wireless communication automatically established without the intervention of a human network administrator.

A second example of the method 600 will now be described in connection with FIGS. 2 and 5. In this second example, as with the first example, the method 600 is performed by a software implementation of the system 500 that is running on the network server 202. In this second example, prior to act 602, a network administrator realizes that the network printer 218 is not communicating wirelessly with other wireless devices in the network 200. In response, the network administrator connects a portion of the network cable 236 to the network printer 218. Then, at act 602, the identification module 502 identifies that the desktop computer 204, the network printer 218, and the WAPs 220-234, as well as the network server 202 are wired to the network 200. At act 604, the configuration retrieval module 504 retrieves configuration information from the desktop computer 204, the network printer 218, the WAPs 220-234, and the network server 202. At act 606, the configuration retrieval module 504 stores the configuration information for each of the desktop computer 204, the network printer 218, the WAPs 220-234, and the network server 202 in the configuration database 506. At act 608, the incompatibility retrieval module 508 retrieves wireless device incompatibility information and corresponding configuration solutions for each of the desktop computer 204, the network printer 218, the WAPs 220-234, and the network server 202. This incompatibility information and corresponding configuration solutions can be retrieved, for example, from a publicly accessible database. At act 610, the incompatibility retrieval module 508 stores the wireless device incompatibility information and the corresponding configuration solutions in the incompatibility database 510.

Continuing with the second example, at act 612, the communication module 512 attempts to contact each of the desktop computer 204, the network printer 218, and the WAPs 220-234 over an IEEE 802.11b wireless communication channel in order to determine if one or more wireless capabilities of each wireless device is functioning properly. In this second example, at act 612 the communication module 512 will determine that all wireless capabilities of all wireless devices of the network 200 are functioning properly except for the network printer 218, which does not appear to be communicating wirelessly with any other wireless device in the wireless network 200.

Continuing with the second example, at act 614, the incompatibility resolution module 514 compares the configuration information stored in the configuration database 506 for the network printer 218 and other wireless devices in the network 200 to the wireless device incompatibility information for the network printer 218 stored in the incompatibility database 510. If it is determined that the method 600 is set for automatic configuration at act 616, this comparison enables the incompatibility resolution module 514 at act 618 to automatically configure the malfunctioning network printer 218 according to one or more configuration solutions. For example, the incompatibility resolution module 514 might discover that a known incompatibility exists between some software running on the network printer 218 and the WAPs 220-234, and that the corresponding configuration solution is to install a software patch onto each of the WAPs 220-234. Therefore, at act 618, the incompatibility resolution module 514 can install the software patch onto each of the WAPs 220-234 and thereby automatically configure the WAPs 220-234 to wirelessly communicate with the network printer 218. This second example illustrates how an incompatibility between the network printer 218 and the WAPs 220-234 can be automatically resolved and wireless communication automatically established without the intervention of a human network administrator. This second example also illustrates how the apparent malfunctioning of the network printer 218 can be automatically resolved by automatically changing the wireless device configuration of the WAPs 220-234 even though the WAPs 220-234 did not appear to be malfunctioning.

A third example of the method 600 will now be described in connection with FIGS. 3 and 5. In this third example, as with the first and second examples, the method 600 is performed by a software implementation of the system 500 that is running on the network server 302. In this third example, prior to act 602, a network administrator realizes that the WAP 328 is not communicating wirelessly with other wireless devices in the network 300. In response, the network administrator connects a portion of the network cable 338 to the WAP 328. Then, at act 602, the identification module 502 identifies that the desktop computer 306 and the WAP 328, as well as the network server 302 are wired to the network 300. At act 604, the configuration retrieval module 504 retrieves configuration information from the desktop computer 306, the WAP 328, and the network server 302. In this third example, the configuration retrieval module 504 also retrieves configuration information from all other wireless devices in the network 300 that are in wireless communication with the network server 302. Alternatively, the retrieval of configuration information from some or all of the wireless devices in the network 300 can be performed prior to act 602.

Continuing with the third example, at act 606, the configuration retrieval module 504 stores the configuration information for each of the desktop computer 306, the WAP 328, and the network server 302 in the configuration database 506. In this third example, the configuration retrieval module 504 also stores configuration information from all other wireless devices in the network 300 that are in wireless communication with the network server 302 in the configuration database 506. At act 608, the incompatibility retrieval module 508 retrieves wireless device incompatibility information and corresponding configuration solutions for each of the wireless devices for which the configuration retrieval module 504 retrieved configuration information at act 606. This incompatibility information and corresponding configuration solutions can be retrieved, for example, from an electronic bulletin board that lists incompatibility information and corresponding configuration solutions in a computer readable format. At act 610, the incompatibility retrieval module 508 stores the wireless device incompatibility information and the corresponding configuration solutions in the incompatibility database 510.

Continuing with the third example, at act 612, the communication module 512 attempts to contact each of the wireless devices for which the configuration retrieval module 504 retrieved configuration information at act 606 over an IEEE 802.16 wireless communication channel in order to determine if one or more wireless capabilities of each wireless device is functioning properly. In this third example, at act 612 the communication module 512 will determine that all wireless capabilities of all wireless devices of the network 300 are functioning properly except for the WAP 328, which does not appear to be communicating wirelessly with any other wireless device in wireless the network 300.

Continuing with the third example, at act 614, the incompatibility resolution module 514 compares the configuration information stored in the configuration database 506 for the WAP 328 and other wireless devices in the network 300 to the wireless device incompatibility information and corresponding configuration solutions stored in the incompatibility database 510. If it is determined that the method 600 is set for automatic configuration at act 616, this comparison enables the incompatibility resolution module 514 at act 618 to automatically configure the malfunctioning WAP 328 according to one or more configuration solutions. For example, the incompatibility resolution module 514 might discover that a known incompatibility exists between a certain default configuration setting of the WAP 328 and all other wireless devices in the network 300, and that the corresponding configuration solution is to change the default configuration setting of the WAP 328 to a configuration setting that is compatible with all other wireless devices in the network 300. Therefore, at act 618, the incompatibility resolution module 514 can automatically change the default configuration setting and thereby automatically configure the WAP 328 to wirelessly communicate with other wireless devices in the network 300. This third example illustrates how an incompatibility between the WAP 328 and other wireless devices in the network 300 can be automatically resolved and wireless communication automatically established without the intervention of a human network administrator.

In a fourth example of the method 600, if it is determined that the method 600 is not set for automatic configuration at act 616, act 618 could be replaced with act 620 of informing a user, such as a network administrator, of an optimal solution or a possible solution for establishing wireless communication between the malfunctioning wireless device and the wireless network. Examples of optimal solutions or possible solutions that would require the intervention of a human network administrator include, but are not limited to, the replacement of some or all of the hardware of the malfunctioning wireless device or the relocation of one or more wireless devices to a more optimal range for wireless communication.

Likewise, a network administrator may wish to maintain control over any configuration changes and may desire, therefore, to make all configuration changes to all wireless devices, even where such changes could be made automatically. The network administrator can be informed at act 620, for example, by email sent to the network administrator's email account or by an automatically generated voice message that is sent to the network administrator's cellular phone. This fourth example illustrates how an optimal solution to incompatibilities between wireless devices in a network can be automatically formulated and how a network administrator can be automatically notified of the optimal solution without the intervention of a human network administrator.

The method 600 could also involve verifying that each wireless port in a network is up and running. The method 600 could also involve verifying that any wireless devices that are wired to the network have wired IP addresses that appear on a list of authorized IP addresses in order to identify any unauthorized wireless devices that are connected to the network. This could involve passively listening for logins on a network to determine if wireless devices that are logging into the network are authorized wireless devices. An additional aspect of the method 600 could be to enable a network administrator to input a particular wireless device configuration profile to compare all other wireless device configurations against where a certain wireless device configuration profile is desirable.

Moreover, the method 600 could involve comparing any wireless device configuration with the configurations of any known wireless hotspot, such as airports, large hotel chains, and coffee shop chains. Also, a database of compatible and non-compatible hardware and drivers can be updated as often as new data is published that affects the database. For example, the method 600 could involve checking for updates to drivers and hardware daily or at some other periodic interval.

IV. Another Example Method for Resolving Wireless Device Configuration Problems

Figure 7:
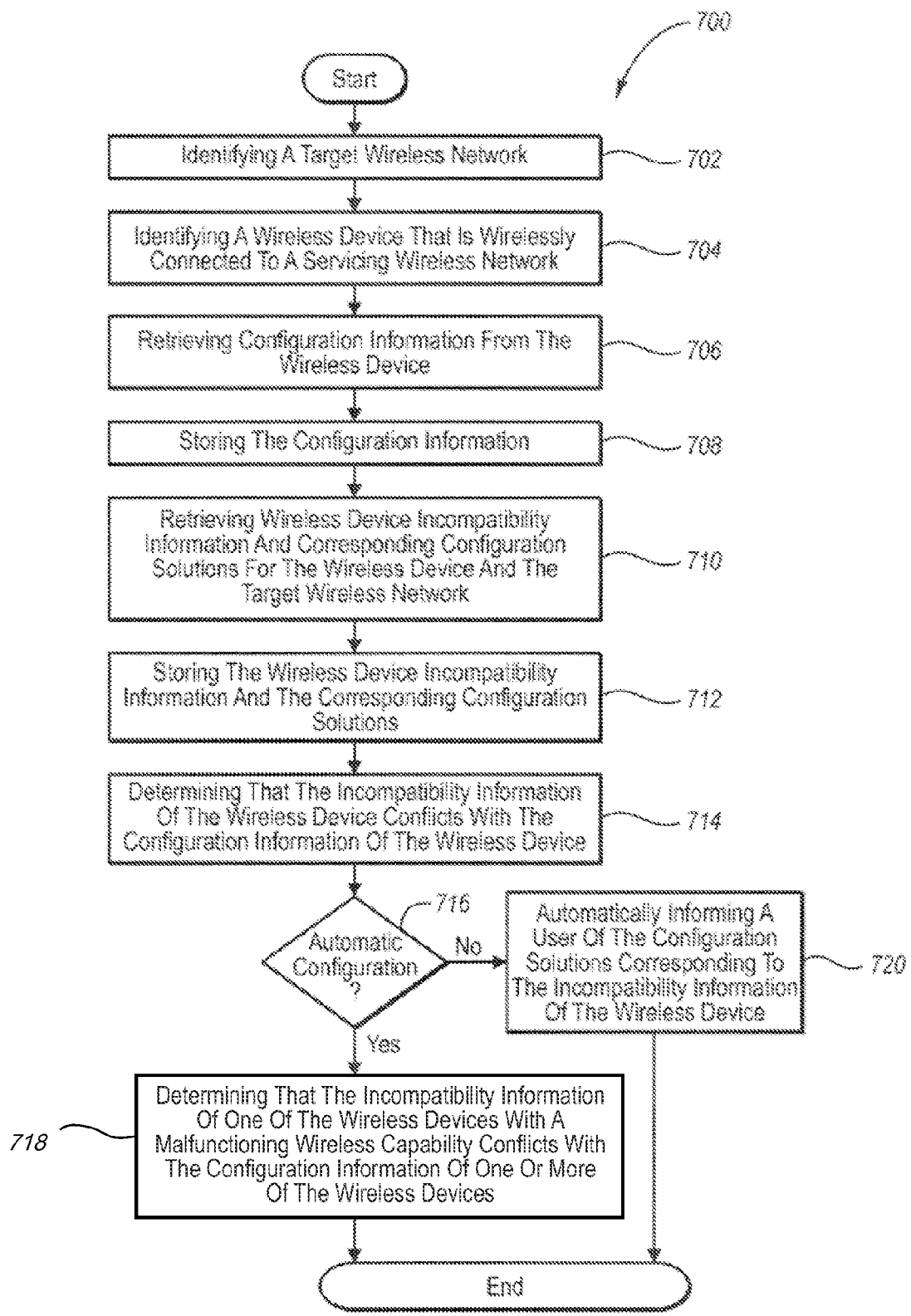
FIG. 7 discloses another example method for resolving wireless device configuration problems.

Turning now to FIG. 7, a method 700 for resolving wireless device configuration problems is disclosed. The method 700 differs from the method 600 in that the method 700 can be implemented on a wireless device that is remote from the wireless network that is experiencing wireless device configuration problems. The method 700 includes identifying a target wireless network (702), identifying a wireless device that is wirelessly connected to a servicing wireless network (704), retrieving configuration information from the wireless device (706), storing the configuration information (708), retrieving wireless device incompatibility information and corresponding configuration solutions for the wireless device and the target wireless network (710), storing the wireless device incompatibility information and the corresponding configuration solutions (712), determining that the incompatibility information of the wireless device conflicts with the configuration information of the wireless device (714), determining whether the method 700 is set for automatic configuration (716), and, depending on the result of act 716, either automatically configuring the wireless device according to the configuration solutions corresponding to the incompatibility information of the wireless device (718) or automatically informing a user of the configuration solutions corresponding to the incompatibility information of the wireless device (720). Acts 702-720 of the method 700 do not necessarily have to be performed in the order shown in FIG. 7. For example, acts 710 and 712 could be performed before or after any of acts 702-708. Other sequences of acts 702-720 are also possible and are included within the scope of the method 700.

An example of the method 700 will now be described in connection with FIGS. 4 and 5. In this example, the method 700 is performed by a software implementation of the system 500 that is running on the cellular phone 408. In this example, the cellular phone 408 is used by a network administrator responsible for the maintenance of the laptop computer 404. At act 702, the identification module 502 identifies that the user of the laptop 404 wishes to connect wirelessly to a network associated with the WAP 402 (the "target network"). This identification can be accomplished by a phone call placed from the cellular phone 406 to the cellular phone 408. The location of the target network can either be manually entered by the user of the cellular phone 406, or can be automatically determined using GPS or other location identifying technology. For example, if the user of the cellular phone 406 and the laptop computer 404 are located in a particular airport or coffee shop, this fact can be determined at act 702 and a wireless network corresponding to the particular airport or coffee shop can automatically be identified by the identification module 502 as the target network.

Continuing with the example, at act 704, the identification module 502 identifies that the laptop computer 404 is wirelessly connected to a servicing network. The servicing network in this example consists of the wireless network that exists between the cellular phone 408, the cellular phone 406, and the laptop computer 404. As discussed above in connection with FIG. 4, the cellular phone 408 and the cellular phone 406 can communicate using the GSM standard, and the cellular phone 406 can communicate with the laptop computer 404 using the IEEE 802.15.1 network protocol, although other network protocols are possible, and GSM and IEEE 802.15.1 are only examples. The servicing network can enable, for example, the cellular phone 408 to communicate with the laptop 404 through the cellular phone 406.

Continuing with the example, at act 706, the configuration retrieval module 504 retrieves configuration information from the laptop computer 404. At act 708, the configuration retrieval module 504 stores the configuration information for the laptop computer 404 in the configuration database 506. At act 710, the incompatibility retrieval module 508 retrieves wireless device incompatibility information and corresponding configuration solutions for each of the laptop computer 404 and the target network, including wireless device incompatibility information and corresponding configuration solutions for the WAP 402. This incompatibility information and corresponding configuration solutions can be retrieved, for example, by connecting over the internet to a website associated with the target network. At act 712, the incompatibility retrieval module 508 stores the wireless device incompatibility information and the corresponding configuration solutions in the incompatibility database 510.

Continuing with the example, at act 714, the incompatibility resolution module 514 compares the configuration information stored in the configuration database 506 for the laptop computer 404 to the wireless device incompatibility information and corresponding configuration solutions stored in the incompatibility database 510. If it is determined that the method 700 is set for automatic configuration at act 716, this comparison enables the incompatibility resolution module 514 at act 718 to automatically configure the malfunctioning laptop computer 404 according to one or more configuration solutions. For example, the incompatibility resolution module 514 might discover that a known incompatibility exists between a default setup setting of the laptop computer 404 and the target network, and that the corresponding configuration solution is to change the default setup setting of the laptop computer 404 to be compatible with the target network. Therefore, at act 718, the incompatibility resolution module 514 can automatically change the default setup setting and thereby automatically configure the laptop computer 404 to wirelessly communicate with the target network. This change of the default setup setting can be accomplished using the servicing network by sending an executable script from the cellular phone 408 to the cellular phone 406 using GSM, which can then be passed from the cellular phone 406 to the laptop computer 404 using IEEE 802.15.1. The script can then be automatically executed on the laptop computer 404. Once executed, the script will automatically change the default setup setting on the laptop computer 404 and thereby automatically configure the laptop computer 404 to wirelessly communicate with the target network.

This example illustrates how an incompatibility between the laptop computer 404 and a target wireless network can be automatically resolved and wireless communication automatically established without the intervention of a human network administrator. This example also illustrates how a software application running on the cellular phone of a network administrator can use two separate wireless communication protocols, GSM and IEEE 802.15.1 to wirelessly change the wireless device configuration of a laptop computer.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code in the form of computer-executable instructions or data structures and which can be accessed by a general purpose or special purpose computer. Combinations of the above should also be included within the scope of computer-readable media.

However, it should be understood, that upon reaching various computer system components program code in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, all perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for resolving wireless device configuration problems, the method comprising the following acts:
   for each of a plurality of wireless devices, retrieving configuration information of the wireless device from the wireless device via network cabling that connects the wireless device to a network;
   attempting to contact a first wireless device of the plurality of wireless devices over at least one wireless communication channel in order to determine whether at least one wireless capability of the first wireless device is functioning properly;
   determining that the at least one wireless capability of the first wireless device is malfunctioning;
   retrieving predetermined incompatibility information for the first wireless device and a corresponding configuration solution; and
   determining that the retrieved predetermined incompatibility information for the first wireless device conflicts with the configuration information of at least one of the plurality of wireless devices.

2. The method as recited in claim 1, wherein the act of retrieving the predetermined incompatibility information for the first wireless device and the corresponding configuration solution comprises an act of retrieving the predetermined incompatibility information for the first wireless device and the corresponding configuration solution by connecting over the internet to a website for a manufacturer of the first wireless device.

3. The method as recited in claim 1, further comprising the act of storing the retrieved predetermined incompatibility information for the first wireless device and the corresponding configuration solution.

4. The method as recited in claim 3, wherein the act of storing the retrieved predetermined incompatibility information for the first wireless device and the corresponding configuration solution further comprises the act of indexing the stored predetermined incompatibility information for the first wireless device and the corresponding configuration solution according to at least one of manufacturer, model, revision, driver, protocol, or patch.

5. The method as recited in claim 1, further comprising an act of automatically configuring the first wireless device according to the configuration solution corresponding to the predetermined incompatibility information for the first wireless device.

6. The method as recited in claim 1, further comprising an act of automatically configuring a second wireless device of the plurality of wireless devices according to the configuration solution corresponding to the predetermined incompatibility information for the first wireless device.

7. The method as recited in claim 1, further comprising an act of automatically informing a user of the configuration solution corresponding to the incompatibility information for the first wireless device.

8. The method as recited in claim 7, wherein the act of automatically informing a user comprises at least one of; sending an email to the user, and automatically sending a voice message to the user.

9. The method as recited in claim 1, wherein the act of determining that the at least wireless capability of the first wireless device is malfunctioning comprises:
  determining that the first wireless device is not communicating wirelessly with any other wireless device among the plurality of wireless devices in the network; and
  determining that communication with the first wireless device is only possible over the network cabling connecting the first wireless device to the network.

10. A method, comprising:
  identifying a target wireless network;
  identifying a wireless device that is wirelessly connected to a servicing wireless network and which wireless device is not connected to the target wireless network;
  retrieving configuration information of the wireless device from the wireless device;
  retrieving predetermined wireless device incompatibility information for the wireless device and for the target wireless network and further retrieving a corresponding configuration solution to wirelessly connect the wireless device to the target wireless network; and
  determining that the incompatibility information conflicts with the configuration information of the wireless device.

11. The method as recited in claim 10, further comprising an act of automatically configuring the wireless device according to the configuration solution corresponding to the incompatibility information of the wireless device.

12. The method as recited in claim 10, further comprising an act of automatically informing a user of the configuration solution corresponding to the incompatibility information of the wireless device.

13. The method as recited in claim 12, wherein the act of automatically informing a user comprises sending an email sent to the user or automatically sending a voice message to the user.

14. The method of claim 10, wherein the steps of: identifying the target wireless network; retrieving the configuration information of the wireless device; retrieving the predetermined wireless device incompatibility information for the wireless device and for the target wireless network and further retrieving the corresponding configuration solution; and determining that the incompatibility information conflicts with the configuration information of the wireless device, are performed by a mobile telephone that is connected to the wireless device via the servicing network.

15. A method, comprising:
  identifying all wireless devices that are connected via network cabling to a network server of a network;
  retrieving from each of the wireless devices that are connected via the network cabling to the network server configuration information of the wireless device;
  retrieving incompatibility information and corresponding configuration solutions for each of the wireless devices that are connected via the network cabling to the network server;
  attempting to contact each of the wireless devices that are connected via the network cabling to the network server, said attempted contact being made of over one or more wireless communication channels, in order to determine if one or more wireless capabilities of the wireless devices that are connected via the network cabling to the network server are malfunctioning; and
  determining that the incompatibility information for a malfunctioning wireless device among the wireless devices that are connected via the network cabling to the network server and which has a malfunctioning wireless capability conflicts with the configuration information of one or more of the wireless devices that are connected via the network cabling to the network server.

16. The method of claim 15, wherein retrieving the wireless device incompatibility information and the corresponding configuration solution comprises retrieving the wireless device incompatibility information and the corresponding configuration solution from a data repository external to the network.

17. The method of claim 15, further comprising automatically configuring the malfunctioning wireless device according to the configuration solution corresponding to the incompatibility information for the malfunctioning wireless device.

18. The method of claim 15, further comprising automatically informing a user of the network server of the configuration solution corresponding to the incompatibility information of the wireless device.

19. The method of claim 15, further comprising retrieving from each of a plurality of second wireless devices that are in wireless communication with the network server configuration information for the wireless device.

20. The method of claim 19, further comprising retrieving wireless device incompatibility information and corresponding configuration solutions for each of the second wireless devices that are in wireless communication with the network server.

* * * * *